US012665264B2

(12) United States Patent
Kim et al.

(10) Patent No.: US 12,665,264 B2
(45) Date of Patent: Jun. 23, 2026

(54) BATTERY MODULE, BATTERY PACK, AND VEHICLE

(71) Applicant: LG ENERGY SOLUTION, LTD., Seoul (KR)

(72) Inventors: Tae-Geun Kim, Daejeon (KR); Hyuk An, Daejeon (KR); Sung-Tack Hwang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 686 days.

(21) Appl. No.: 18/022,397

(22) PCT Filed: Feb. 8, 2022

(86) PCT No.: PCT/KR2022/001941
§ 371 (c)(1),
(2) Date: Feb. 21, 2023

(87) PCT Pub. No.: WO2022/173200
PCT Pub. Date: Aug. 18, 2022

(65) Prior Publication Data
US 2023/0327294 A1    Oct. 12, 2023

(30) Foreign Application Priority Data

Feb. 10, 2021    (KR) ........................ 10-2021-0019348

(51) Int. Cl.
*H01M 50/516* (2021.01)
*H01M 50/211* (2021.01)
(Continued)

(52) U.S. Cl.
CPC ....... *H01M 50/516* (2021.01); *H01M 50/211* (2021.01); *H01M 50/507* (2021.01); *B60L 50/64* (2019.02)

(58) Field of Classification Search
CPC ............ H01M 50/516; H01M 50/207; H01M 50/211; H01M 50/20
See application file for complete search history.

(56) References Cited

U.S. PATENT DOCUMENTS

2015/0136438 A1    5/2015   Lumetta
2018/0315977 A1*   11/2018  Park .................... H01M 50/503
(Continued)

FOREIGN PATENT DOCUMENTS

CN        110692149 A    1/2020
EP        3 046 164 A1   7/2016
(Continued)

OTHER PUBLICATIONS

European Search Report for European Application No. 22752960.9 dated Feb. 27, 2024.

(Continued)

*Primary Examiner* — Kenneth J Douyette
(74) *Attorney, Agent, or Firm* — Birch, Stewart, Kolasch & Birch, LLP

(57) ABSTRACT

Discussed is a battery module in which welding reliability between an electrode lead and a bus bar may be improved and manufacturing costs reduced. A battery module may include a plurality of battery cells each including an electrode lead, a bus bar including a lead welding portion adhered to the electrode lead of each of the plurality of battery cells, and a bus bar frame including an insertion space into which at least a portion of the bus bar is inserted, and a jig support configured to support a welding jig that is configured to press the electrode lead, in a direction opposite to a pressing direction of the welding jig.

11 Claims, 12 Drawing Sheets

(51) Int. Cl.
_H01M 50/507_ (2021.01)
_B60L 50/64_ (2019.01)

(56) References Cited

U.S. PATENT DOCUMENTS

| | | | |
|---|---|---|---|
| 2019/0103624 A1 | 4/2019 | Lim et al. | |
| 2020/0020915 A1* | 1/2020 | Chi | H01M 50/507 |
| 2020/0203698 A1 | 6/2020 | Jin et al. | |
| 2020/0266416 A1 | 8/2020 | Lee et al. | |
| 2020/0295337 A1* | 9/2020 | You | H01M 50/50 |
| 2020/0411832 A1 | 12/2020 | Jin et al. | |
| 2021/0083254 A1 | 3/2021 | You et al. | |
| 2021/0210821 A1 | 7/2021 | Okada et al. | |
| 2021/0296738 A1 | 9/2021 | Lee et al. | |
| 2021/0344083 A1 | 11/2021 | Kim et al. | |

FOREIGN PATENT DOCUMENTS

| | | |
|---|---|---|
| EP | 3 547 401 A1 | 10/2019 |
| EP | 3 637 502 A1 | 4/2020 |
| IN | 202017019085 A | 8/2020 |
| JP | 2015-112004 A | 6/2015 |
| JP | WO2017/130706 A1 | 11/2018 |
| JP | 2019-186041 A | 10/2019 |
| KR | 10-2018-0119372 A | 11/2018 |
| KR | 10-2019-0037922 A | 4/2019 |
| KR | 10-2019-0083914 A | 7/2019 |
| KR | 10-2019-0107396 A | 9/2019 |
| KR | 10-2019-0122055 A | 10/2019 |
| KR | 10-2019-0135865 A | 12/2019 |
| KR | 10-2020-0078237 A | 7/2020 |
| KR | 10-2021-0002919 A | 1/2021 |
| KR | 10-2198848 B1 | 1/2021 |

OTHER PUBLICATIONS

International Search Report for PCT/KR2022/001941 (PCT/ISA/210) mailed on May 18, 2022.

* cited by examiner

FIG. 14

BATTERY MODULE, BATTERY PACK, AND VEHICLE

TECHNICAL FIELD

The present disclosure relates to a battery module, a battery pack, and a vehicle, and more particularly, to a battery module in which the reliability of a welding portion between an electrode lead and a bus bar is improved and manufacturing costs are reduced, and a battery pack and a vehicle including the battery module.

The present application claims priority to Korean Patent Application No. 10-2021-0019348 filed on Feb. 10, 2021 in the Republic of Korea, the disclosures of which are incorporated herein by reference.

BACKGROUND ART

As the demand for portable electronic products such as laptops, video cameras, and mobile phones has recently rapidly increased and the development of electric vehicles, energy storage batteries, robots, satellites, etc. has begun in earnest, research on high-performance secondary batteries capable of repeated charge/discharge has been actively conducted.

Currently commercialized secondary batteries include nickel cadmium batteries, nickel hydride batteries, nickel zinc batteries, and lithium secondary batteries. Among them, lithium secondary batteries are in the spotlight because they have almost no memory effect compared to nickel-based secondary batteries, and thus have advantages of free charge/discharge, very low self-discharge rate, and high energy density.

A lithium secondary battery mainly uses a lithium-based oxide and a carbon material as a positive electrode active material and a negative electrode active material, respectively. Also, the lithium secondary battery includes an electrode assembly in which a positive electrode plate and a negative electrode plate to which the positive electrode active material and the negative electrode active material are respectively applied are located with a separator therebetween, and a casing, that is, a battery case, for sealing and accommodating the electrode assembly along with an electrolytic solution.

According to a shape of a casing, lithium secondary batteries may be classified into can-type secondary batteries in which an electrode assembly is received in a metal can, and pouch-type secondary batteries in which an electrode assembly is received in a pouch of an aluminum laminate sheet.

In a conventional battery module, a bus bar is applied to electrically connect stacked battery cells, and a plurality of electrode leads drawn out from the plurality of battery cells are bent, placed on the bus bar, and then welded.

When the conventional battery module is manufactured as described above, in a state where the bent electrode lead is placed on the bus bar, the electrode lead is pressed toward the bus bar by using a welding jig to be in close contact with the bus bar, and then welding is performed by emitting a laser to the electrode lead.

Also, in the related art, the welding jig is supported only by the bus bar, and there are cases where the bus bar is not stably fixed on a bus bar frame. Accordingly, in the related art, while the bus bar supports the welding jig, the bus bar is likely to move by a pressing force of the welding jig or a position of the bus bar is likely to be changed. For this reason, a close contact state between the electrode lead and the bus bar is not maintained, thereby reducing welding reliability between the electrode lead and the bus bar.

Furthermore, to support a pressing force of the welding jig, the bus bar needs to have a certain thickness sufficient to have a certain mechanical rigidity or more. Accordingly, there is a great limitation in reducing a thickness of the bus bar in the related art.

DISCLOSURE

Technical Problem

The present disclosure is designed to solve the problems of the related art, and therefore the present disclosure is directed to providing a battery module in which welding reliability of a welding portion between an electrode lead and a bus bar is improved and manufacturing costs are reduced, and a battery pack and a vehicle including the battery module.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof

Technical Solution

In an aspect of the present disclosure, there is provided a battery module including: a plurality of battery cells each including an electrode lead; a bus bar including a lead welding portion adhered to the electrode lead of each of the plurality of battery cells; and a bus bar frame including an insertion space into which at least a portion of the bus bar is inserted, and a jig support configured to support a welding jig that is configured to press the electrode lead, in a direction opposite to a pressing direction of the welding jig.

Also, the bus bar may further include a jig extending portion configured to support the welding jig in the direction opposite to the pressing direction of the welding jig.

Furthermore, the bus bar may further include a frame insertion portion including an inward space into which the jig support is inserted.

Furthermore, a protruding portion of the bus bar may protrude outward, and a through-slit through which an end portion of the electrode lead passes may be formed in the protruding portion of the bus bar.

Also, a protruding portion of the bus bar may protrude outward, and an insertion groove into which an end portion of the electrode lead is inserted may be formed in the protruding portion of the bus bar.

Furthermore, the jig support may contact the electrode lead.

Also, a protruding portion of the jig support may protrude outward, and a fixing slit through which an end portion of the electrode lead passes may be formed in the protruding portion of the jig support.

Also, a protruding portion of the jig support may protrude outward, and a fixing groove into which an end portion of the electrode lead is inserted may be formed in the protruding portion of the jig support.

In another aspect of the present disclosure, there is provided a battery pack including at least one battery module as described above.

In another aspect of the present disclosure, there is provided a vehicle including at least one battery module as described above.

Advantageous Effects

According to an aspect of the present disclosure, because a battery module includes a bus bar frame including an insertion space into which at least a portion of a bus bar is inserted and a jig support for supporting a welding jig, a state where an electrode lead is in close contact with a lead welding portion of the bus bar may be stably maintained. That is, because the bus bar frame may stably limit the movement of the bus bar by accommodating a portion of the bus bar and may effectively restrain a pressing force of the welding jig by using the jig support, the bus bar may be prevented from being moved or deformed by a pressing force of the welding jig. Accordingly, welding reliability between the electrode lead and the bus bar may be effectively improved.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

FIG. 14 is a side view illustrating an appearance of a vehicle according to an embodiment of the present disclosure.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the present disclosure, so it should be understood that other equivalents and modifications could be made thereto without departing from the scope of the present disclosure.

Figure 1:
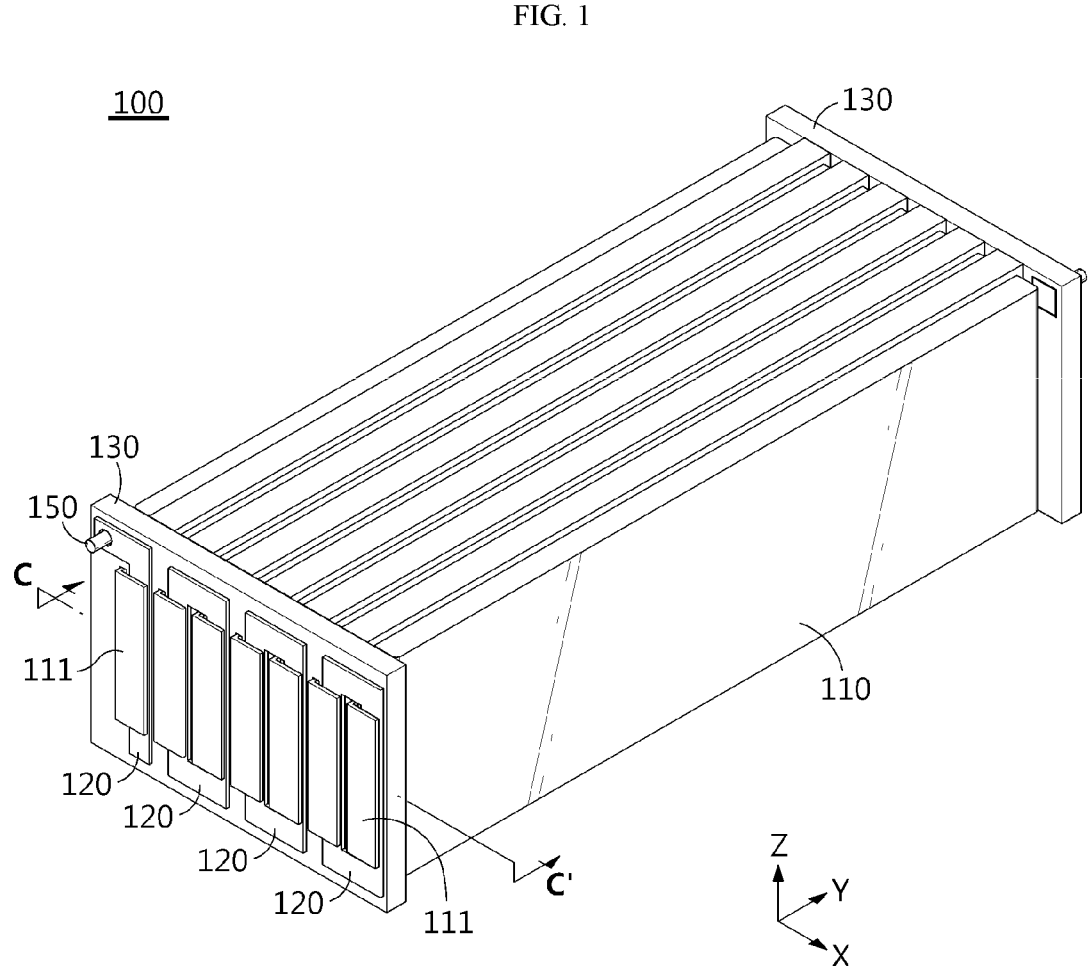
FIG. 1 is a perspective view illustrating a battery module according to Embodiment 1 of the present disclosure.
Figure 2:
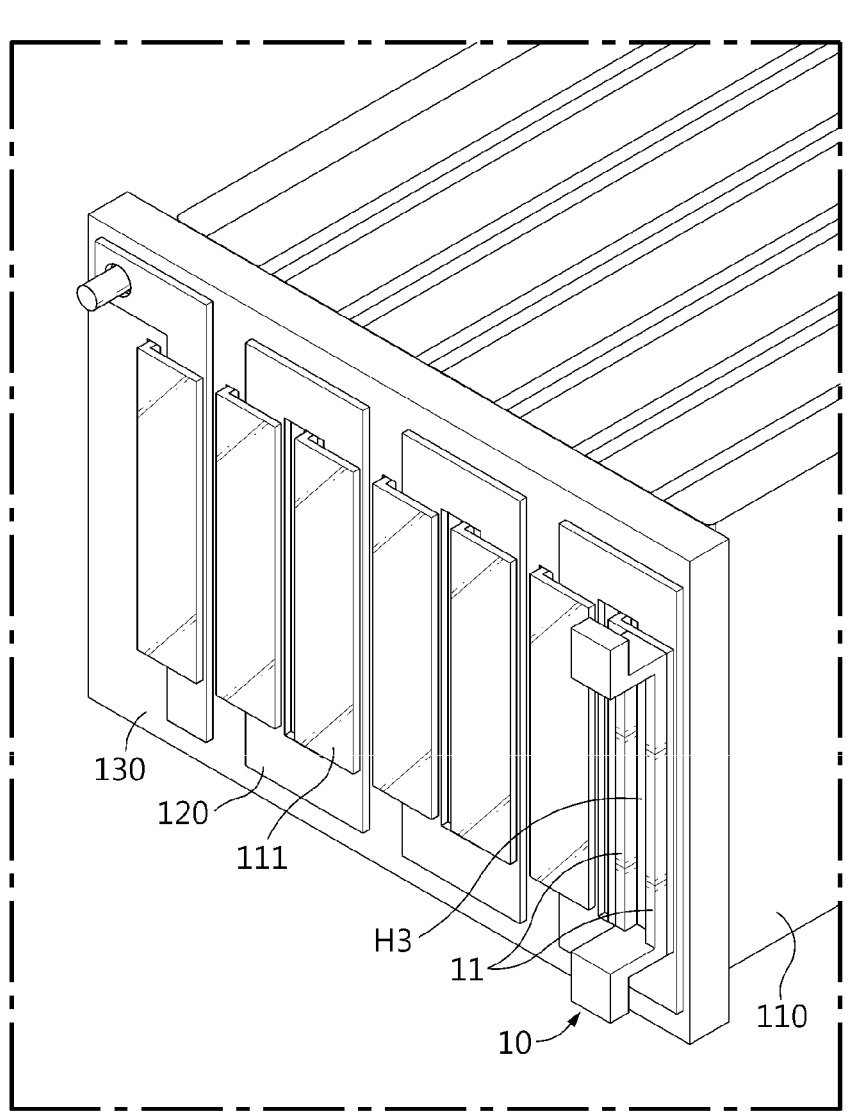
FIG. 2 is a perspective view illustrating the battery module of FIG. 1 and a welding jig.
Figure 3:
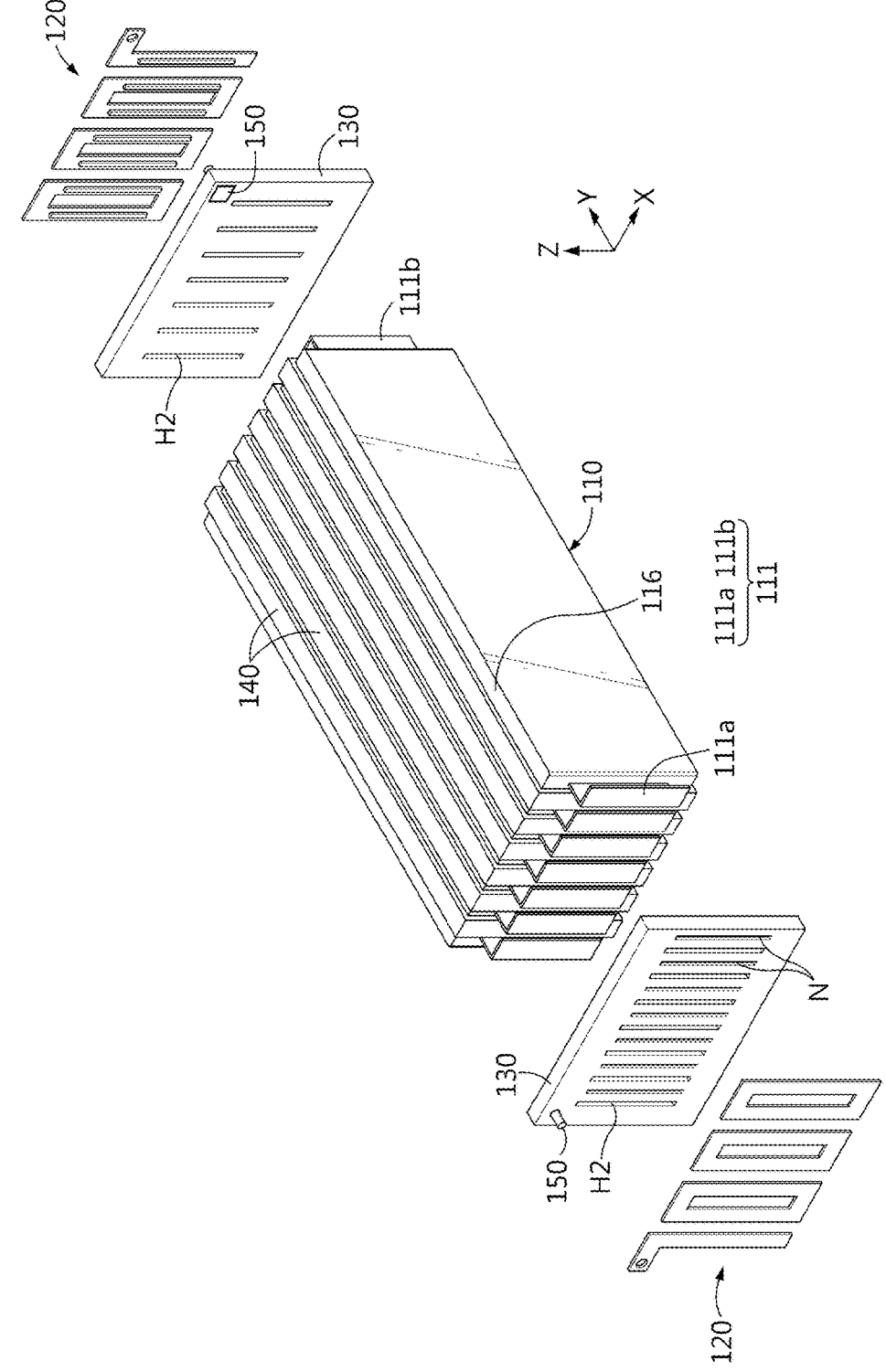
FIG. 3 is an exploded perspective view illustrating elements of the battery module according to Embodiment 1 of the present disclosure.
Figure 4:
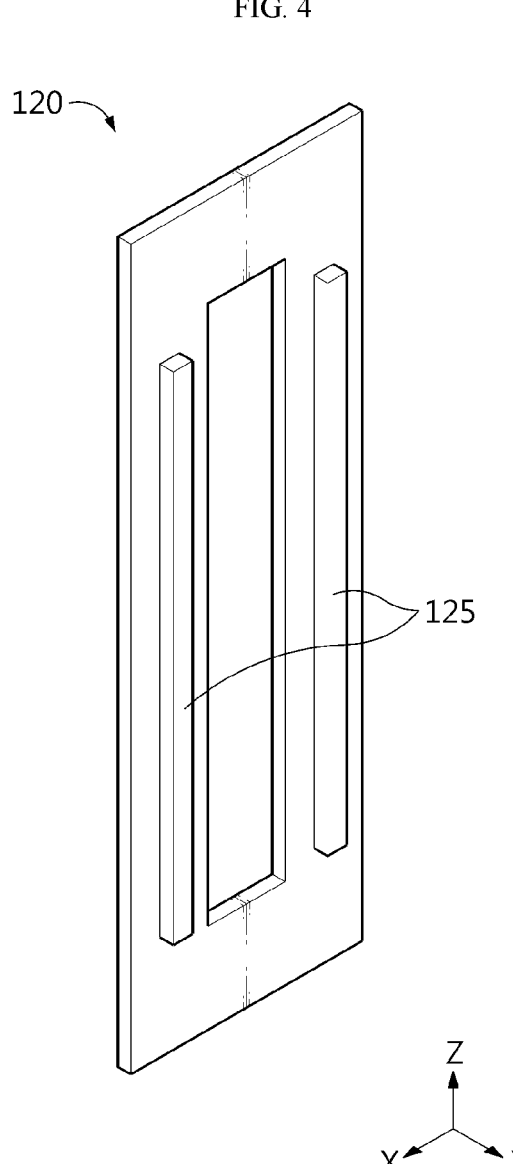
FIG. 4 is a rear perspective view illustrating a bus bar of the battery module according to Embodiment 1 of the present disclosure.
Figure 5:
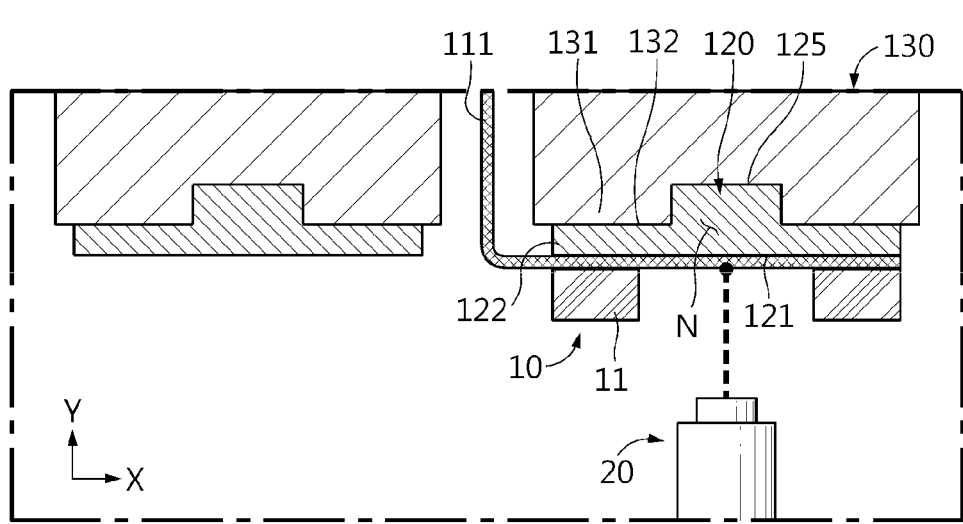
FIG. 5 is a partial horizontal cross-sectional view illustrating the battery module of FIG. 1 taken along line C-C'.

FIG. 1 is a perspective view illustrating a battery module according to Embodiment 1 of the present disclosure. FIG. 2 is a perspective view illustrating the battery module of FIG. 1 and a welding jig. FIG. 3 is an exploded perspective view illustrating elements of the battery module according to Embodiment 1 of the present disclosure. FIG. 4 is a rear perspective view illustrating a bus bar of the battery module according to Embodiment 1 of the present disclosure. FIG. 5 is a partial horizontal cross-sectional view illustrating the battery module of FIG. 1 taken along line C-C'. For reference, an X-axis direction, a Y-axis direction, and a Z-axis direction in FIG. 1 respectively represent a right direction, a rear direction, and an up direction.

Referring to FIGS. 1 through 5, a battery module 100 according to Embodiment 1 of the present disclosure includes a plurality of battery cells 110, a bus bar 120, and a bus bar frame 130 including a jig support 131.

In detail, the plurality of battery cells 110 may be arranged in a left-right direction (X-axis direction). The battery cells 110 may be pouch-type battery cells 110 each including an electrode assembly (not shown), an electrolytic solution (not shown), and a pouch 116 in which the electrode assembly and the electrolytic solution are accommodated. An outer peripheral portion of the pouch 116 may be sealed through thermal fusion. A cartridge 140 may be located between the plurality of battery cells 110. The cartridge 140 may be configured so that the plurality of battery cells 110 are uniformly arranged. A portion of the battery cell 110 may be accommodated in the cartridge 140. For example, the cartridge 140 may include an electrically insulating plastic material.

Also, each of the plurality of battery cells 110 may include an electrode lead 111. The electrode lead 111 may be formed of an aluminum alloy or a copper alloy. For example, the battery cell 110 may include a positive electrode lead 111a and a negative electrode lead 111b at both end portions in a front-back direction. The electrode lead 111 may protrude from the pouch 116 in the front-back direction. The electrode lead 111 may be bent in the left-right direction through, for example, a bending jig. For example, as shown in FIG. 3, the positive electrode lead 111a may be bent in the right direction. The negative electrode lead 111b may be bent in the left direction.

However, the battery cell 110 is not necessarily limited to the pouch-type battery cell 110, and may be any of various battery cells 110 well known at the time of filling the present application.

Also, the battery module 100 may further include at least one bus bars 120 for electrically connecting the plurality of battery cells 110. In detail, the bus bar 120 may include a conductive metal. The conductive metal may be, for example, copper, aluminum, or nickel. The bus bar 120 may be electrically connected to a module terminal 150. For example, as shown in FIG. 1, an end portion of the bus bar 120 located at a rightmost position may be electrically connected to the module terminal 150.

Furthermore, the bus bar 120 may include a lead-through hole H1 through which the electrode lead 111 passes, as shown in FIG. 3. The electrode lead 111 may protrude to the outside through the lead-through hole H1. A protruding portion of the electrode lead 111 may be bent in the left direction or the right direction to contact an outer surface of the bus bar 120. Due to the structural characteristics, the bus bars 120 may be electrically connected to the positive electrode lead 111a and the negative electrode lead 111b. The bus bar 120 may include a lead welding portion 121 adhered to the electrode lead 111 of each of the plurality of battery cells 110. For example, the electrode lead 111 may be welded to an outer surface of the lead welding portion 121. In this case, a welding method is not limited to a specific method, and laser welding or ultrasonic welding may be used. For example, as shown in FIG. 5, in a state where the electrode lead 111 is pressed toward the bus bar 120 by a pressing portion 11 of a welding jig 10, the electrode lead 111 and the lead welding portion 121 of the bus bar 120 may be laser welded through a laser emitted by a laser welding device 20.

Also, at least one bus bar 120 may be mounted on an outer surface of the bus bar frame 130. Also, the bus bar frame 130 may include a lead insertion hole H2 communicating with the lead-through hole H1 of the bus bar 120. The electrode lead 111 of the battery cell 110 may pass through the lead insertion hole H2.

The bus bar frame 130 may include an insertion space N into which at least a portion 125 of the bus bar 120 is inserted. For example, as shown in FIG. 5, a rear end portion 125 of the lead welding portion 121 of the bus bar 120 may be inserted into the insertion space N formed in the bus bar frame 130. Such a coupling structure between the bus bar 120 and the bus bar frame 130 may limit the movement of the bus bar 120 in the left-right direction in a state where the bus bar 120 is mounted on the bus bar frame 130. That is, because a portion of the bus bar 120 is inserted into the insertion space N, the bus bar 120 may be stably fixed on the bus bar frame 130.

Furthermore, the bus bar frame 130 may include a jig support 131. The jig support 131 may a portion of the bus bar frame 130 protruding in an outer direction (Y-axis direction) more than the rest of the bus bar frame 130. The jig support 131 may support the welding jig 10 in a direction opposite to a pressing direction of the welding jig 10. The welding jig 10 may fix the electrode lead 111 to be in close contact with the bus bar 120. The welding jig 10 may press an outer surface (front surface) of the electrode lead 111 in the rear direction. Also, when the welding jig 10 fixes the electrode lead 111 located on a rear portion of the battery module 100 onto the bus bar 120, the welding jig 10 may press an outer surface of the electrode lead 111 in a front direction.

The welding jig 10 may include two pressing portions 11 for pressing the electrode lead 111 toward the bus bar 120 or the bus bar frame 130, as shown in FIG. 2. Each of the two pressing portions 11 may have a flat outer surface parallel to the electrode lead 111. The two pressing portions 11 may be spaced apart from each other in the left-right direction based on the lead welding portion of the bus bar.

Accordingly, according to the configuration of the present disclosure, because the bus bar frame 130 includes the insertion space N into which at least a portion of the bus bar 120 is inserted and the jig support 131 for supporting the welding jig 10, a state where the electrode lead 111 is in close contact with the lead welding portion 121 of the bus bar 120 may be stably maintained. That is, because the bus bar frame 130 may stably limit the movement of the bus bar 120 by accommodating a portion of the bus bar 120 and may effectively restrain a pressing force of the welding jig 10 by using the jig support 131, the bus bar frame 130 may prevent the bus bar 120 from being moved or deformed by a pressing force of the welding jig 10. Accordingly, welding reliability between the electrode lead 111 and the bus bar 120 may be effectively improved.

Also, the bus bar 120 may further include a jig extending portion 122. The jig extending portions 122 may support the welding jig 10 in a direction opposite to the pressing direction of the welding jig 10. The jig extending portions 122 may extend from both sides of the lead welding portion 121 in the left-right direction. That is, the jig extending portion 122 may support the welding jig 10 in a direction opposite to the pressing direction along with the jig support 131 of the bus bar frame 130.

Accordingly, according to the configuration of the present disclosure, because the present disclosure includes the bus bar 120 including the jig extending portion 122 for supporting the welding jig 10 along with the jig support 131 of the bus bar frame 130, when compared to the related art in which the welding jig 10 is supported only by the bus bar 120, a greater force for restraining the welding jig 10 may be exerted, and thus, the welding jig 10 may be more stably supported. Furthermore, because the jig support 131 of the bus bar frame 130 supports the welding jig 10, even when a structural rigidity of a portion of the bus bar 120 which supports the welding jig 10 is relatively small, the welding jig 10 may be stably supported. Accordingly, a thickness of the jig extending portion 122 of the bus bar 120 may be further reduced. For example, a thickness of the jig extending portion 122 of the bus bar 120 may be less than a thickness of the lead welding portion 121. Ultimately, because a size of the bus bar 120 may be effectively reduced, the battery module 100 of the present disclosure may have a smaller weight and manufacturing costs of the battery module 100 may be effectively reduced.

Furthermore, according to the present disclosure, because both the jig support 131 of the bus bar frame 130 and the jig extending portion 122 of the bus bar 120 may support the welding jig 10 together, the welding jig 10 may be more stably supported. Accordingly, because the electrode lead 111 may be stably fixed on the bus bar 120, weldability between the electrode lead 111 and the bus bar 120 may be effectively improved.

The bus bar 120 may include a frame insertion portion 132 including an inward space into which the jig support 131 is inserted. For example, as shown in FIG. 5, the jig support 131 of the bus bar frame 130 may face a rear surface of the jig extending portion 122 of the bus bar 120. The inward space into which the jig support 131 is inserted may be formed in the jig extending portion 122 formed on each of both sides of the bus bar 120.

Accordingly, according to the configuration of the present disclosure, because the bus bar 120 includes the frame insertion portion 132 including the inward space into which the jig support 131 is inserted, a coupling area between the bus bar 120 and the bus bar frame 130 may be effectively increased, and thus, a stable coupling state between the bus bar 120 and the bus bar frame 130 may be maintained. Furthermore, in the present disclosure, because the jig support 131 of the bus bar frame 130 and the jig extending portion 122 of the bus bar 120 may support the welding jig 10 while being stacked on each other, the welding jig 10 may be more stably supported. Accordingly, because the electrode lead 111 may be stably fixed on the bus bar 120, weldability between the electrode lead 111 and the bus bar 120 may be effectively improved.

Figure 6:
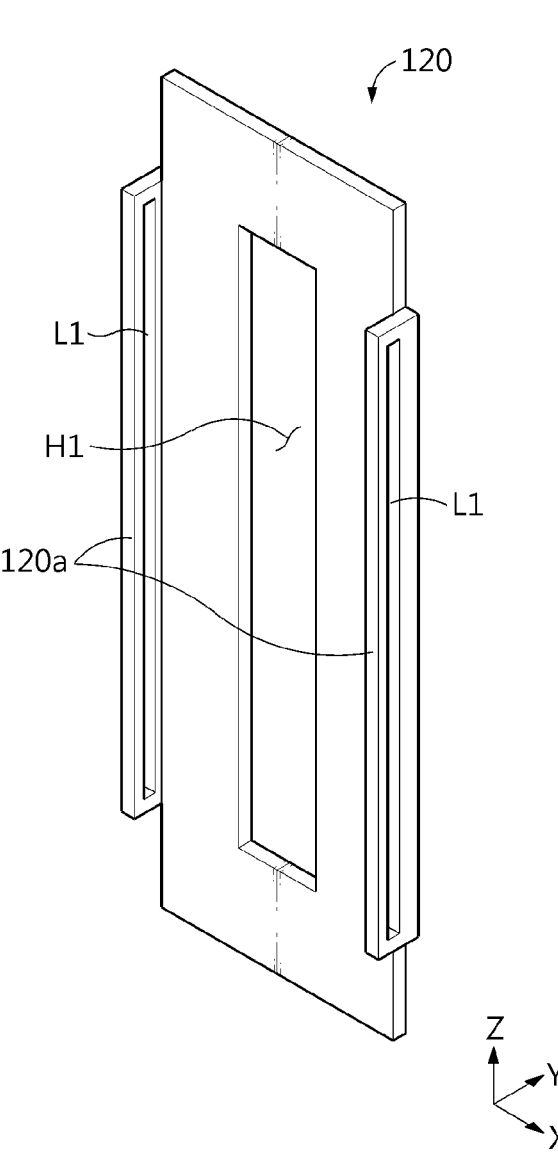
FIG. 6 is a perspective view illustrating a bus bar of a battery module according to Embodiment 2 of the present disclosure.
Figure 7:
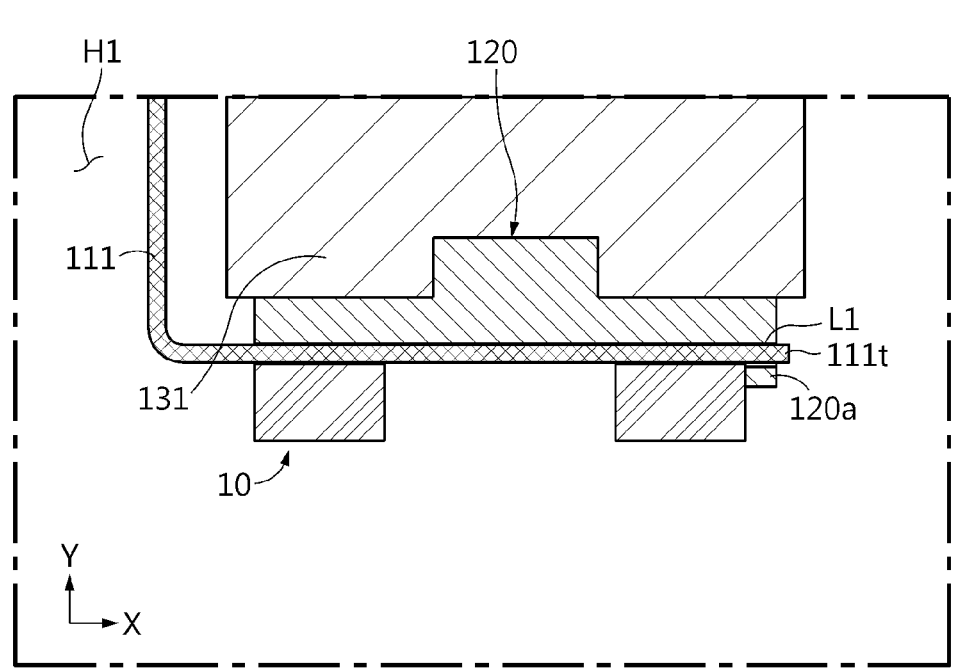
FIG. 7 is a partial horizontal cross-sectional view illustrating the battery module according to Embodiment 2 of the present disclosure.

FIG. 6 is a perspective view illustrating a bus bar of a battery module according to Embodiment 2 of the present disclosure. FIG. 7 is a partial horizontal cross-sectional view illustrating the battery module according to Embodiment 2 of the present disclosure.

Referring to FIGS. 6 and 7, when the battery module 100 according to Embodiment 2 of the present disclosure is compared to the battery module 100 of Embodiment 1, a shape of the bus bar 120 may be different. Other elements are the same as those of the battery module 100 of Embodiment 1, and thus, a more detailed description thereof will be omitted.

A portion 120a of the bus bar 120 of FIG. 6 may protrude outward. For example, the portion 120a of the bus bar 120 which is relatively far from the lead-through hole H1 may protrude outward. That is, a portion of the bus bar 120 on which an end portion 111t of the electrode lead 111 is to be located may protrude outward. As shown in FIG. 6, both end portions may protrude forward with respect to the lead-through hole H1 of the bus bar 120. The portion 120a protruding outward may include a through-slit L1 through which the end portion 111t of the electrode lead 111 passes. For example, as shown in FIG. 7, the electrode lead 111 passing through the lead-through hole H1 of the bus bar 120 may be bent to contact the lead welding portion 121 of the bus bar 120, and the end portion 111t of the bent electrode lead 111 may pass through the through-slit L1 of the bus bar 120. The electrode lead 111 may be fixed in a state where the end portion 111t is inserted into the through-slit L1 of the bus bar 120.

Accordingly, in the configuration of the present disclosure, because the bus bar 120 includes the through-slit L1 into which the end portion 111t of the electrode lead 111 is inserted, the electrode lead 111 may be stably fixed on the bus bar 120 while being in close contact with the lead welding portion 121. Accordingly, in the present disclosure, weldability between the electrode lead 111 and the bus bar 120 may be effectively improved.

Figure 8:
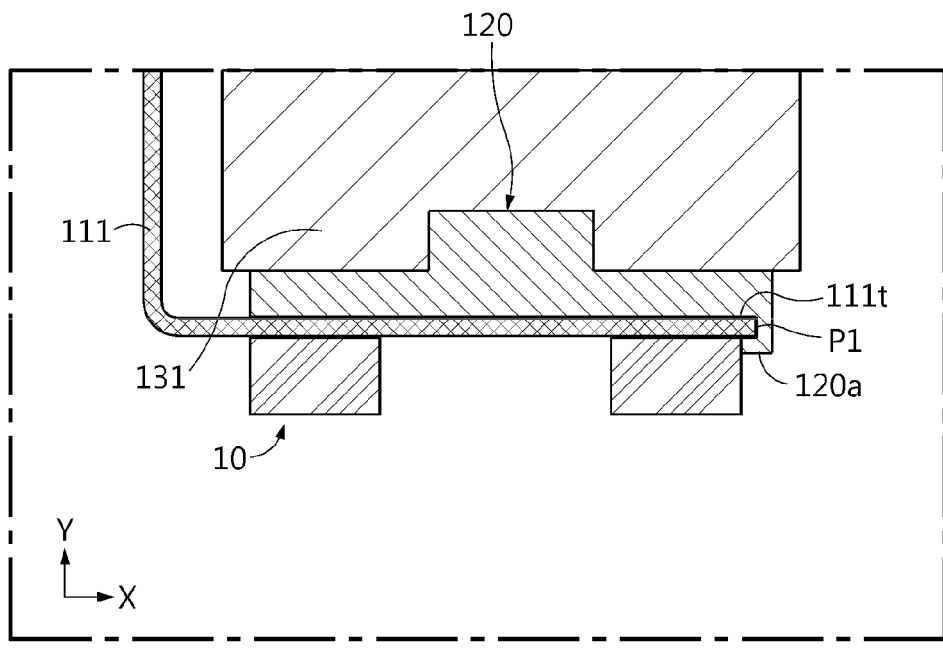
FIG. 8 is a partial horizontal cross-sectional view illustrating a battery module according to Embodiment 3 of the present disclosure.

FIG. 8 is a partial horizontal cross-sectional view illustrating a battery module according to Embodiment 3 of the present disclosure.

Referring to FIG. 8, when the battery module 100 according to Embodiment 3 of the present disclosure is compared to the battery module 100 of Embodiment 2 of FIG. 7, a shape of the bus bar 120 may be different. That is, the bus bar 120 of FIG. 8 may include an insertion groove P1, instead of the through-slit L1. Other elements of the battery module 100 of FIG. 8 are the same as those of the battery module 100 of FIG. 7.

In detail, the portion 120a of the bus bar 120 may protrude outward. For example, the portion 120a of the bus bar 120 which is relatively far from the lead-through hole H1 may protrude outward. That is, a portion of the bus bar 120 on which an end portion of the electrode lead 111 is to be located may further protrude outward. Both end portions may protrude forward with respect to the lead-through hole H1 of the bus bar 120. The portion 120a protruding outward may include the insertion groove P1 into which an end portion of the electrode lead 111 is inserted. For example, as shown in FIG. 8, the electrode lead 111 passing through the lead-through hole H1 of the bus bar 120 may be bent to contact the lead welding portion 121 of the bus bar 120, and an end portion of the bent electrode lead 111 may be inserted into the insertion groove P1 of the bus bar 120. The electrode lead 111 may be fixed in a state where the end portion of the electrode lead 111 is inserted into the insertion groove P1 of the bus bar 120.

Accordingly, according to the configuration of the present disclosure, because the bus bar 120 includes the insertion groove P1 into which an end portion of the electrode lead 111 is inserted, the electrode lead 111 may be stably fixed on the bus bar 120 while being in close contact with the lead welding portion 121. Accordingly, in the present disclosure, weldability between the electrode lead 111 and the bus bar 120 may be effectively improved.

Figure 9:
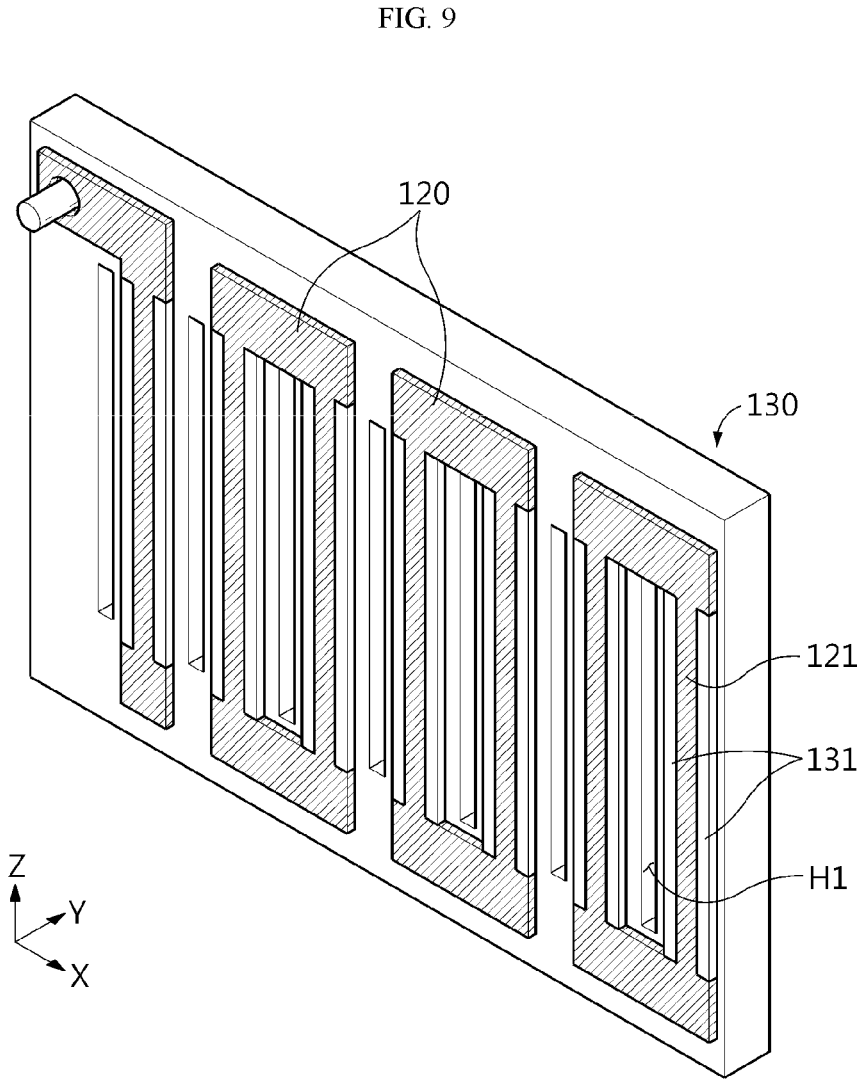
FIG. 9 is a perspective view illustrating a bus bar and a bus bar frame of a battery module according to Embodiment 4 of the present disclosure.
Figure 10:
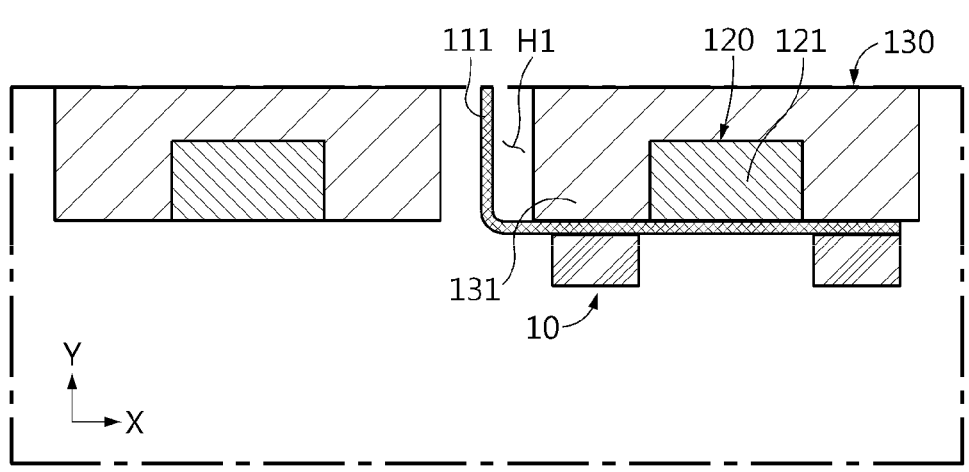
FIG. 10 is a horizontal cross-sectional view illustrating the battery module according to Embodiment 4 of the present disclosure.

FIG. 9 is a perspective view illustrating a bus bar and a bus bar frame of a battery module according to Embodiment 4 of the present disclosure. FIG. 10 is a horizontal cross-sectional view illustrating the battery module according to Embodiment 4 of the present disclosure.

Referring to FIGS. 9 and 10, in the battery module according to Embodiment 4 of the present disclosure, the jig support 131 of the bus bar frame 130 may directly contact the electrode lead 111. That is, in the battery module 100 according to Embodiment 1 of the present disclosure, the jig extending portion 122 of the bus bar 120 contacts the electrode lead 111, whereas, in the battery module 100 according to Embodiment 4 of the present disclosure, an element for supporting the welding jig 10, that is, the jig extending portion 122 (see FIG. 5), may not be formed on the bus bar 120. Instead, the jig support 131 of the bus bar frame 130 may restrain the welding jig 10 in a direction opposite to a pressing force of the welding jig 10 and may support the welding jig 10.

For example, as shown in FIG. 9, the jig support 131 of the bus bar frame 130 may protrude outward (forward) to be parallel to an outer surface of the lead welding portion 121 of the bus bar 120. Also, the jig support 131 of the bus bar frame 130 may be inserted into an inward space formed in each of both end portions of the bus bar 120.

For example, as shown in FIG. 10, the electrode lead 111 passing through the lead-through hole H1 of the bus bar 120 may be bent to directly contact the jig support 131 of the bus bar frame 130, and an end portion of the bent electrode lead 111 may be located on the jig support 131 of the bus bar frame 130. Also, the electrode lead 111 may be pressed by the welding jig 10 to be fixed on the jig support 131 of the bus bar frame 130.

Accordingly, according to the configuration of the present disclosure, because the jig support 131 contacts the electrode lead 111, a portion of the bus bar 120 does not need to support the welding jig 10, and thus, the portion may be omitted. Accordingly, in the battery module 100 of the present disclosure, because a size of the bus bar 120 may be effectively reduced, the battery module 100 having a smaller weight may be provided, and manufacturing costs of the battery module 100 may be effectively reduced.

Figure 11:
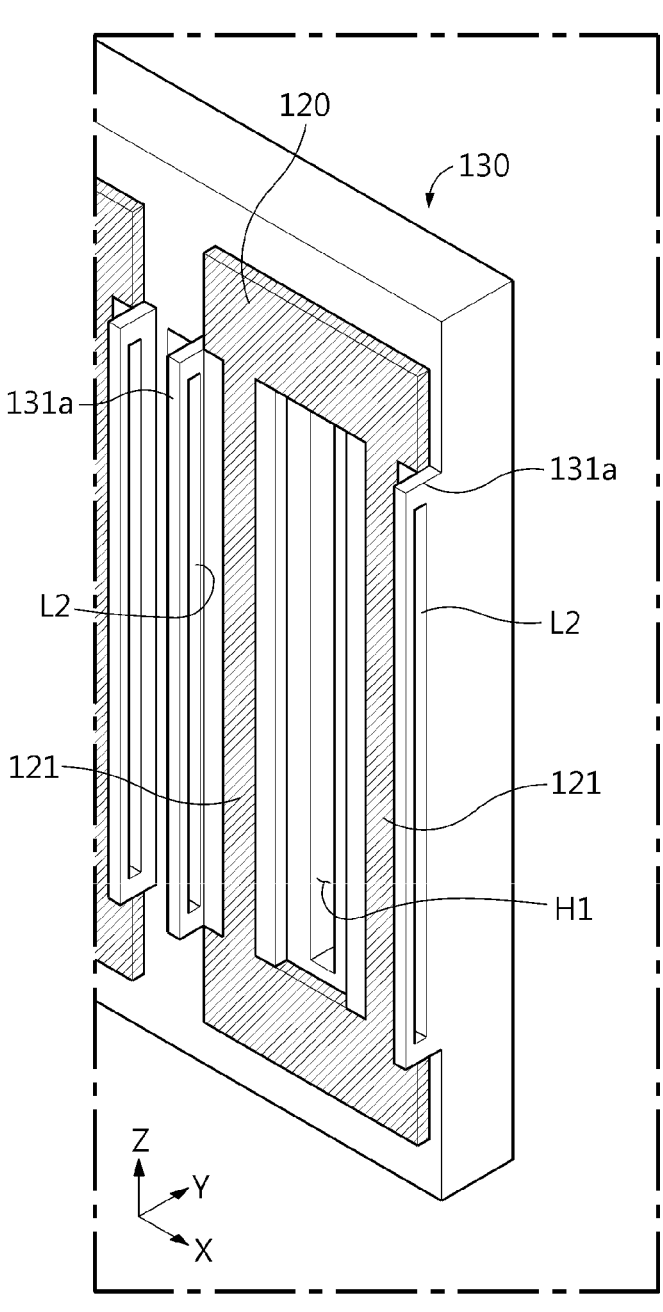
FIG. 11 is a partial perspective view illustrating a bus bar and a bus bar frame of a battery module according to Embodiment 5 of the present disclosure.
Figure 12:
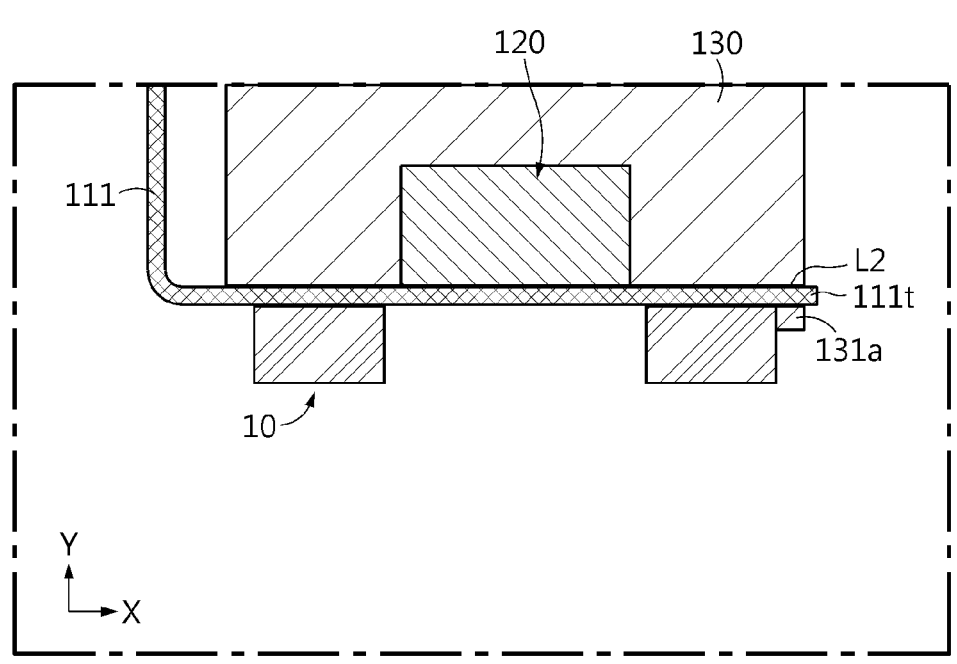
FIG. 12 is a partial horizontal cross-sectional view illustrating the battery module according to Embodiment 5 of the present disclosure.

FIG. 11 is a partial perspective view illustrating a bus bar and a bus bar frame of a battery module according to Embodiment 5 of the present disclosure. FIG. 12 is a partial horizontal cross-sectional view illustrating the battery module according to Embodiment 5 of the present disclosure.

Referring to FIGS. 11 and 12, a portion of the jig support 131 may protrude outward. For example, a portion 131*a* of the jig support 131 which is relatively far from the lead-through hole H1 of the bus bar 120 may protrude outward. That is, a portion of the jig support 131 on which an end portion of the electrode lead 111 is to be located may further protrude outward. The portion 131*a* of the jig support 131 formed on each of both sides of the bus bar frame 130 with respect to the lead-through hole H1 of the bus bar 120 may protrude forward. The portion 131*a* protruding outward may include a fixing slit L2 through which an end portion of the electrode lead 111 passes. For example, as shown in FIG. 12, the electrode lead 111 passing through the lead-through hole H1 of the bus bar 120 may be bent to contact the lead welding portion 121 of the bus bar 120, and an end portion of the bent electrode lead 111 may be inserted into the fixing slit L2 of the jig support 131. The electrode lead 111 may be fixed in a state where the end portion is inserted into the fixing slit L2 of the bus bar frame 130.

Accordingly, according to the configuration of the present disclosure, because the jig support 131 of the bus bar frame 130 includes the fixing slit L2 through which an end portion of the electrode lead 111 passes, the electrode lead 111 may be stably fixed on the bus bar 120 while being in close contact with the lead welding portion 121. Accordingly, in the present disclosure, weldability between the electrode lead 111 and the bus bar 120 may be effectively improved.

Figure 13:
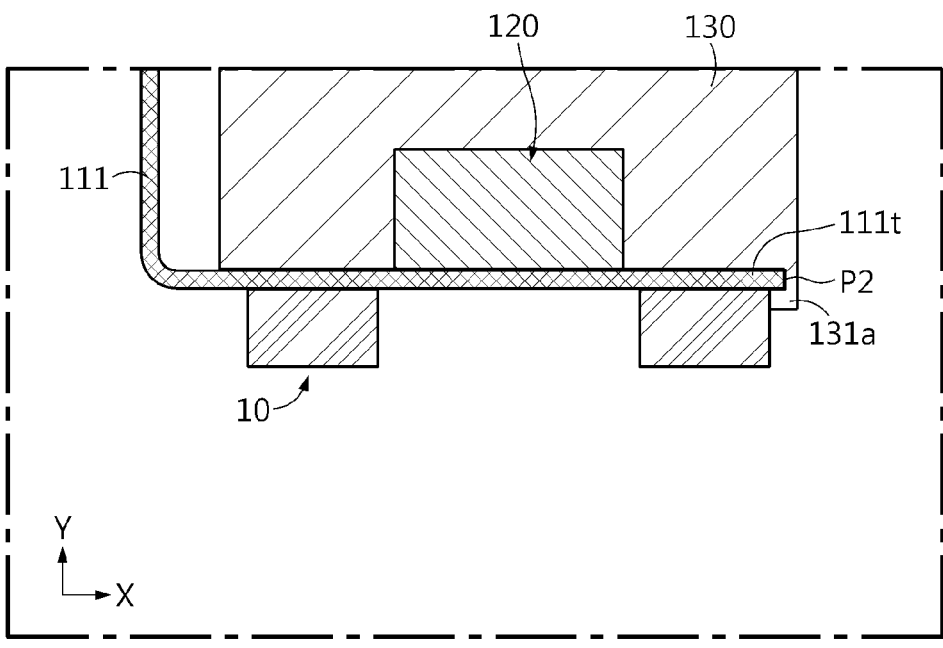
FIG. 13 is a partial horizontal cross-sectional view illustrating a battery module according to Embodiment 6 of the present disclosure.

FIG. 13 is a partial horizontal cross-sectional view illustrating a battery module according to Embodiment 6 of the present disclosure.

When the battery module 100 according to Embodiment 6 of the present disclosure is compared to the battery module 100 of Embodiment 5 of FIG. 12, a shape of the jig support 131 of the bus bar frame 130 may be different. That is, the bus bar 120 of FIG. 13 may include a fixing groove P2, instead of the fixing slit L2 (see FIG. 12). Other elements of the battery module 100 of FIG. 13 are the same as those of the battery module 100 of FIG. 12.

Referring to FIG. 13, the portion 131*a* of the jig support 131 may protrude outward. For example, the portion 131*a* of the jig support 131 which is relatively far from the lead-through hole H1 of the bus bar 120 may protrude outward. That is, a portion of the jig support 131 on which an end portion of the electrode lead 111 is to be located may further protrude outward. The portion 131*a* of the jig support 131 formed on each of both sides of the bus bar frame 130 with respect to the lead-through hole H1 of the bus bar 120 may protrude forward. The portion protruding outward may include the fixing groove P2 into which an end portion of the electrode lead 111 is inserted. For example, as shown in FIG. 13, the electrode lead 111 passing through the lead-through hole H1 of the bus bar 120 may be bent to contact the lead welding portion 121 of the bus bar 120, and an end portion of the bent electrode lead 111 may be inserted into the fixing groove P2 of the jig support 131. The electrode lead 111 may be fixed in a state where the end portion is inserted into the fixing groove P2 of the bus bar frame 130.

Accordingly, according to the configuration of the present disclosure, because the jig support 131 of the bus bar frame 130 includes the fixing groove P2 into which an end portion of the electrode lead 111 is inserted, the electrode lead 111 may be stably fixed on the bus bar 120 while being in close contact with the lead welding portion 121. Accordingly, in the present disclosure, weldability between the electrode lead 111 and the bus bar 120 may be effectively improved.

A battery pack (not shown) according to an embodiment of the present disclosure may further include various devices (not shown) for controlling charging and discharging of the battery module 100, for example, a battery management system (BMS) module, a current sensor, and a fuse.

Figure 14:
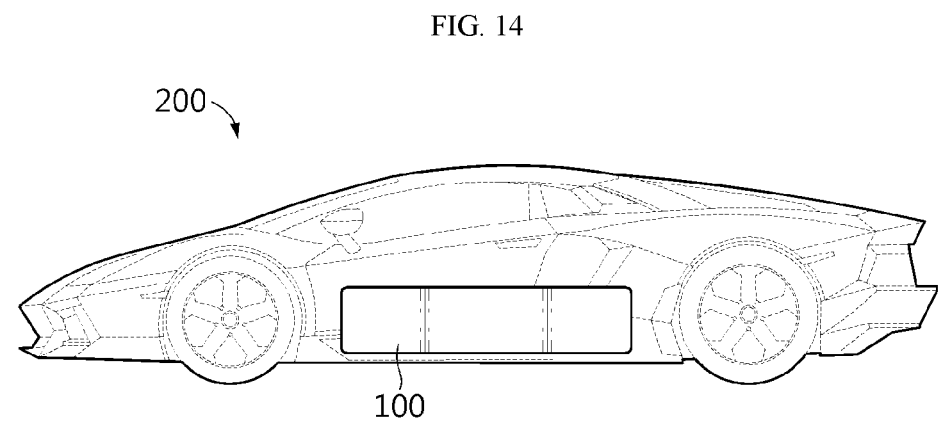

FIG. 14 is a side view illustrating an appearance of a vehicle according to an embodiment of the present disclosure.

Referring to FIG. 14, the battery module 100 according to an embodiment of the present disclosure may be included in a vehicle 200 such as an electric vehicle or a hybrid vehicle. That is, the battery module 100 may be mounted in a vehicle body of the vehicle 200 according to an embodiment of the present disclosure.

It will be understood by one of ordinary skill in the art that when terms indicating directions such as upper, lower, left, right, front, and rear are used, these terms are only for convenience of explanation and may vary according to a position of a target object, a position of an observer, etc.

While one or more embodiments of the present disclosure have been described with reference to the embodiments and figures, the present disclosure is not limited thereto, and it will be understood by one of ordinary skill in the art that various changes in form and details may be made therein without departing from the scope of the present disclosure as defined by the following claims.

---

[Reference Signs]

---

100: battery module
110: battery cell
111, 111a, 111b: electrode lead,
positive electrode lead, negative electrode lead
120: bus bar
H1: lead-through hole
121: lead welding portion
122: jig extending portion
130: bus bar frame
H2: lead insertion hole
131: jig support
132: frame insertion portion
L1: through-slit
L2: fixing slit
P1: insertion groove
P2: fixing groove
10: welding jig
200: vehicle

---

What is claimed is:

1. A battery module comprising:

a plurality of battery cells each comprising an electrode lead;

a bus bar comprising a lead welding portion adhered to the electrode lead of each of the plurality of battery cells; and a bus bar frame comprising a lead insertion hole through which the electrode lead passes, an insertion space into which at least a portion of the bus bar is inserted, and a jig support configured to support a welding jig that is configured to press the electrode lead, in a direction opposite to a pressing direction of the welding jig, wherein the lead insertion hole and the insertion space are spaced from each other in a direction perpendicular to the pressing direction of the welding jig.

2. The battery module according to claim 1, wherein the bus bar further comprises a jig extending portion the welding jig in the direction opposite to the pressing direction of the welding jig.

3. The battery module according to claim 2, wherein the bus bar further comprises a frame insertion portion comprising an inward space into which the jig support is inserted.

4. The battery module according to claim 1, wherein a protruding portion of the bus bar protrudes outward, and a through-slit through which an end portion of the electrode lead passes is formed in the protruding portion of the bus bar.

5. The battery module according to claim 1, wherein a protruding portion of the bus bar protrudes outward, and an insertion groove into which an end portion of the electrode lead is inserted is formed in the protruding portion of the bus bar.

6. The battery module according to claim 1, wherein the jig support contacts the electrode lead.

7. The battery module according to claim 6, wherein a protruding portion of the jig support protrudes outward, and a fixing slit through which an end portion of the electrode lead passes is formed in the protruding portion of the jig support.

8. The battery module according to claim 6, wherein a protruding portion of the jig support protrudes outward, and a fixing groove into which an end portion of the electrode lead is inserted is formed in the protruding portion of the jig support.

9. The battery module according to claim 1, wherein the insertion space is a recess formed at an outer surface of the bus bar frame, and wherein the electrode lead is bent over the outer surface of the bus bar frame to extend in the direction perpendicular to the pressing direction of the welding jig, and the electrode lead overlaps the insertion space.

10. A battery pack comprising at least one battery module according to claim 1.

11. A vehicle comprising at least one battery module according claim 1.

\* \* \* \* \*